United States Patent [19]

Limburg et al.

[11] 3,915,706

[45] Oct. 28, 1975

[54] IMAGING SYSTEM BASED ON PHOTODEGRADABLE POLYALDEHYDES

[75] Inventors: William W. Limburg, Penfield; Dana G. Marsh, Rochester, both of N.Y.

[73] Assignee: Xerox Corporation, Stamford, Conn.

[22] Filed: Mar. 11, 1974

[21] Appl. No.: 450,113

[52] U.S. Cl. .................. 96/27 R; 96/48 HD; 96/35; 96/35.1; 96/115 R; 204/159.14; 204/159.2

[51] Int. Cl.$^2$ ... G03C 5/04; G03C 5/24; G03C 5/00

[58] Field of Search ......... 96/115 R, 27 R, 35, 35.1, 96/48 HD; 204/159.22

[56] References Cited

UNITED STATES PATENTS

| | | | |
|---|---|---|---|
| 2,891,712 | 6/1959 | Plambeck, Jr. | 96/36.3 |
| 3,558,311 | 1/1971 | Delzenne et al. | 96/35.1 |
| 3,779,778 | 12/1973 | Smith et al. | 96/115 R |

*Primary Examiner*—Roland E. Martin, Jr.
*Assistant Examiner*—J. P. Brammer
*Attorney, Agent, or Firm*—James J. Ralabate; James P. O'Sullivan

[57] ABSTRACT

Disclosed is an imaging system based upon the photo induced degradation of certain degradable polyaldehydes containing segments characterized by the formula:

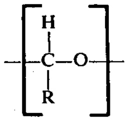

wherein R is H, an alkyl radical of 1 to 6 carbon atoms, a chlorine or fluorine substituted alkyl radical of 1 to 6 carbon atoms or a cyano substituted aliphatic hydrocarbon radical of 1 to 5 carbon atoms. The degradable polyaldehyde in combination with a halogenated polymer and a photoactive reagent which upon activation is capable of abstracting a hydrogen atom from the backbone of the degradable polyaldehyde and halogenated polymer is exposed to activating radiation in an imagewise manner. Imagewise exposure of the composition causes a change in optical density in the exposed areas thereby providing a visible image.

10 Claims, No Drawings

IMAGING SYSTEM BASED ON PHOTODEGRADABLE POLYALDEHYDES

BACKGROUND OF THE INVENTION

Owen and Bailey disclose in the Journal of Polymer Science, Vol. 10, 13–122, (1972) that benzophenone will induce the dehydrohalogenation of polyvinyl chloride and thereby cause a color change. The color change is apparently caused by the increased optical density of the PVC due to the formation of conjugated double bonds during dehydrohalogenation.

It is disclosed in U.S. Pat. No. 2,892,712 (Example VII) that a film of formaldehyde polymer coated with a thin layer of omega, omega-dibromoacetophenone was irradiated with ultraviolet light and baked at 105°C. to provide a sheet having a letter text incised into the surface of the film. This system relies upon the ability of the dibromoacetophenone radical to release Br· radicals which abstract hydrogen atoms from the polymer backbone.

The present invention is based on the interaction which takes place between certain polyaldehydes, halogenated polymers and photoactive reagents to provide a high gain imaging system.

SUMMARY OF THE INVENTION

The present invention is an imaging system which comprises exposing to activating radiation in an imagewise manner a film comprising a halogenated polymer capable of releasing hydrogen halide, said polymer having dispersed therein:

1. a degradable polymeric composition containing segments characterized by the formula:

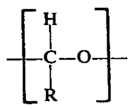

where R is H, an alkyl radical of 1 to 6 carbon atoms, a chlorine or fluorine substituted radical of 1 to 6 carbon atoms or a cyano substituted aliphatic hydrocarbon radical of 1 to 5 carbon atoms; and 2. a photoactive reagent which upon activation is capable of abstracting a hydrogen atom from the polymer backbones of said degradable polymeric composition and halogenated polymer.

DETAILED DESCRIPTION

When the degradable polymer, halogenated polymer and photoactive agent are formed into a thin layer, a cloudy, translucent film results. This is probably due to the mutual incompatibility of the polymers. When the film is exposed to activating radiation, the degradable polymer breaks down with such breakdown resulting in a change in the compatibility of the polymers and a consequent change in optical density of the exposed areas. When lower molecular weight degradable polymers are used, the change in optical density results in the film changing from translucent to clear in the exposed areas to provide a positive working system. With higher molecular weight degradable polymers, the exposed areas become more translucent than the background even to the point of being opaque, thus providing a negative working system.

Suitable degradable polymers for use in the imaging process can be prepared by the polymerization of aldehydes to give polymers which correspond to the formula previously set out. When aldehydes which contain alkyl groups of 1 to 6 carbon atoms attached to the carbonyl carbon atom are polymerized, polymers result in which the R moiety corresponds to the alkyl group of the aldehyde. Examples of aldehydes which contain such moieties include acetaldehyde, propionaldehyde, n-butyraldehyde, isobutyraldehyde, valeraldehyde and heptaldehyde. The R moiety may also be hydrogen as is the case with poly(formaldehyde).

Alternatively, the aldehyde may contain a chlorinated or fluorinated hydrocarbon radical of from 1 to 6 carbon atoms to provide a polyaldehyde in which the R moiety corresponds to the group attached to the carbonyl carbon of the aldehyde. Examples of such aldehydes include chloroacetaldehyde, dichloroacetaldehyde, chloroproionaldehyde, chlorobutyraldehyde, chlorovaleraldehyde, chloroheptaldehyde, trifluoroacetaldehyde, trifluoropropionaldehyde, chlorodifluoroacetaldehyde and fluoroheptaldehyde.

In addition, aldehydes which contain cyano substituted aliphatic hydrocarbon radicals containing from 1 to 5 carbon atoms attached to the carbonyl carbon can be polymerized to form degradable polymers useful in the process of the instant invention. Examples of these aldehydes include cyanoacetaldehyde, beta-cyanopropionaldehyde and 5-cyanopentaldehyde.

When homopolymers of the above-described aldehydes are used in the process, the degradable polymer can be represented by the formula:

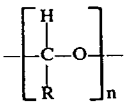

wherein R is as defined above and n is a number representing the degree of polymerization. The degree of polymerization of the homopolymer may be quite low as in the case of oligomers or as high as the realities of the polymerization of the aldehyde permit. In general, those polyaldehydes characterized by the foregoing formula in which n is a number within the range of from 20 to 20,000 are preferred for use in the instant invention.

In addition to homopolymers of the desired aldehydes, copolymers and block copolymers containing degradable segments characterized by the foregoing formula can be employed in the process of the instant invention. For example, copolymers and block copolymers may be prepared from one or more of the aldehydes previously described and other polymerizable constituents such as styrene, isoprene, α-methylstyrene, methylmethacrylate, phenyl isocyanate and ethyl isocyanate. In addition, the degradable segments may occur as side chains appended from the backbone of another polymer.

Suitable halogenated polymers are those which conform to the formula:

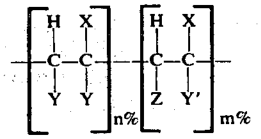

In the above formula, X is chlorine or bromine, Y and Y' are X or hydrogen and Z is Y or an alkyl, aryl or alkaryl constituent containing from 1 to 8 carbon atoms.

The symbols n and m represent numbers which designate the relative mole percent composition of the individual units in the polymer and can vary from 0 to 100 with the sum of n percent and m% being 100. Thus, when Y is hydrogen and n is 100, the formula depicts a poly(vinylhalide), e.g. poly(vinylchloride), when X is chlorine. When Y' is X, Z is H and m is 100, a poly(-vinylidenehalide) is depicted. When Y and Y' are as defined above, and n and m are numbers between 0 percent and 100 percent, a copolymer of a vinylhalide and a vinylidenehalide is depicted. These polymers can be substituted with organic constituents such as when Z is an alkyl, aryl or alkaryl radical. Examples of organic constituents which Z represents include methyl, ethyl, propyl, n-butyl, isobutyl, octyl, phenyl, substituted phenyl, e.g. methylphenyl and ethylphenyl. Polymers containing units corresponding to the above formula which are copolymerized with other monomeric units such as vinylacetate, ethylene, propylene, methylacrylate, ethylacrylate, methylmethacrylate, ethylmethacrylate, styrene, α-methylstyrene, ring substituted styrenes and acrylonitrile are also useful.

Useful photoactive reagents include those compounds which, upon activation, are capable of abstracting a hydrogen atom from the backbone of the degradable polymers. While the process of the instant invention is not predicated upon any particular theory of operation, it is believed that upon irradiation the photoreactive reagent may abstract an H atom from the polyaldehyde backbone thereby forming a free radical species on a carbon atom. At this point, chain cleavage occurs as the result of the rearrangement of electrons in a carbon-oxygen sigma bond and polymer degradation occurs whereby the molecular weight of the polymer is greatly reduced. Simultaneously, the photoactive reagent removes an H atom from the halogenated polymer resulting in the formation of hydrogen halide which causes further degradation of the polyaldehyde.

A preferred class of photoreactive reagents is made up of those compositions which, when subjected to activating radiation, assume a $^3(n,\pi^*)$ or $^1(n,\pi^*)$ state. Many compositions are available which are capable of assuming such a state and are thereby able to abstract a hydrogen atom from the polymer backbone. In general, five classes of compounds are capable of assuming such an excited state and abstracting a hydrogen atom. These classes are:

1. Carbonyl compounds with reactive $^3(n,\pi^*)$ states such as for example, benzophenone, 2-tert-butylbenzophenone, 4-aminobenzophenone, and 4-phenylbenzophenone; substituted acetophenones, e.g. 4-methoxyacetophenone, and aldehydes, e.g. benzaldehyde and anisaldehyde.

2. Thiocarbonyl compounds such as for example, thiobenzophenone, 4,4'-dimethoxythiobenzophenone, substituted thiobenzophenones, thioacetophenone and substituted thioacetophenones.

3. Aromatic nitro compounds having reactive $^3(n,\pi^*)$ states such as nitrobenzene and 1,2-dinitro-3,4,5,6-tetramethylbenzene.

4. Arylimines and alkylimines having reactive $^3(n,\pi^*)$ states such as N-alkylbenzophenoneimine and benzophenone-N-hexylimine.

5. Aromatic amines having reactive $^1(n,\pi^*)$ states such as acridine and phenazine.

Another class of photoactive agents useful in the invention is that of organic peroxides such as for example, dibenzoylperoxide, tert-butylperoxide, 2,4-dichlorobenzoylperoxide and cumylperoxide. In general, those organic peroxides which form free radicals and thereby are able to abstract hydrogen atoms are useful.

An additional class of hydrogen abstracting compounds which can be used in the invention is made up of organic halides, for example, alkyl halides such as carbon tetrachloride, chloroform, carbon tetrabromide and bromoform.

The relative concentrations of degradable polymer, halogenated polymer and photoactive agent may vary widely. The degradable polymer is employed in an effective amount, i.e., that amount which when degraded will produce a visible image in the film. Preferably, the degradable polymer will make up from 1 to 49 weight percent of the composition. The photoactive agent should be present in an effective amount, i.e., that amount which will increase the rate of degradation of the degradable polymer to a noticeable extent. A preferred concentration of photoactive agent is from 0.1 to 5 weight percent of the composition. Larger amounts can be used but are not preferred for economic reasons. In addition, too large a concentration of photoactive reagent will result in phase separation due to its crystallization. The balance of the composition is made up of the halogenated polymer and optionally additional elements which do not destroy the basic and novel characteristics of the composition.

In practicing the method of the present invention, the degradable polymer, halogenated polymer and photoactive agent are dissolved in a suitable solvent and applied to a suitable substrate. Evaporation of the solvent leaves a film which, when exposed to activating radiation, bears a visible image corresponding to the exposed areas. Since the film is self-supporting, it can be stripped from the substrate and used as a projection master. This embodiment is especially useful when degradable polymers are used of a sufficiently low molecular weight so as to provide a clear (as opposed to translucent) image in the exposed areas.

Suitable solvents are those liquid compositions which dissolve both of the polymers and the photoactive reagent and do not detrimentally interact with them. The solvent should be sufficiently volatile so as to be readily evaporated from the solutes. Useful solvents include tetrahydrofuran (THF), acetone, carbon disulfide and methylethyl ketone. Exemplary of substrates upon which the solution may be cast are mylar, glass, metals and coated papers. Since the light-struck areas will appear transparent in some cases, the film may be coated onto a black background to produce a negative appearing final image. In those cases where the optical density of the imaged areas is increased, a positive appearing image is produced.

The thickness of the film is not critical but is generally greater than about 1 micron because of fabrication problems for submicron films. Thicknesses up to about 5 microns or more are satisfactory. The process of coating the film on the substrate may include roller coating, knife coating, nib coating, spraying, brushing, etc. A preferred method is to use a doctor blade as applicator.

Upon casting the film and evaporating the solvent, the composition is ready for imaging which is accomplished by subjecting it to activating radiation in an imagewise fashion, i.e. irradiating the film in those areas in which the image is desired. This is normally done by placing a stencil or negative having areas which are opaque and transparent to the radiation between the light source and the film and directing the light source through this barrier to the film.

Activating radiation, as used herein, is intended to refer to electromagnetic radiation having wavelengths within the range which will excite the photoactive reagent. In most cases, the radiation will be in the ultraviolet region, however, certain photoactive reagents such as the thiocarbonyl compounds are excited by light in the visible or near ultraviolet part of the spectra. When benzophenone is used as the photoactive reagent, irradiation in the ultraviolet range is employed with UV light having wavelengths from 250 to 370 nm being preferred.

The exposure time will vary widely depending on the relative concentrations of halogenated polymer, polyaldehyde and photoreactive agent in the film; the intensity and wavelength of the activating radiation; the thickness of the film and the properties of the substrate. Thus, optimum exposure time for a given plate in order to achieve the desired degree of polymer degradation may require some routine experimentation, but would not require the application of inventive skill. In general, irradiation sufficient to provide 0.1 watt-sec./cm.$^2$ is sufficient to form an image. If one were to employ a P.E.K. Inc. 100 watt high pressure compact point source mercury arc, at least a 5 second exposure would be required. If a Xenon Corporation flash lamp such as the Novatron 213-A were to be employed and operated at a 300 watt input with pulses having $10^{-5}$-$10^{-4}$ second pulse durations, the necessary exposure energy could occur in $10^{-4}$ second total exposure time.

The imaged films described herein are self-fixing, i.e., after a requisite period of time, re-imaging of the film cannot be accomplished. After exposure, the film may be heated to a temperature and for a time sufficient to enhance fixing of the image. Heating the film without illumination does not lead to imaging, nor does prior heating enhance subsequent imaging. After exposure, flood exposure of the entire film for about 2 seconds acts to enhance the image by increasing the optical density difference between exposed and unexposed areas (for the direct or positive working system). In addition, this treatment also decreases the interim period required for self-fixing. At present, the imaged films are self-fixed within a few days, and this period may be shortened by experimentation. Thus, a high intensity UV light level may be used to image, and a low intensity light level used to enhance both contrast and fixing of the image.

The following examples are given to aid in understanding the invention, but it is to be understood that the invention is not restricted to the particular times, proportions, components and other details of the examples.

EXAMPLE I

Poly(acetaldehyde), 0.3 gm., and poly(vinylchloride), 3 gm., are dissolved in 30 milliliters of tetrahydrofuran (THF). Films of the solution are cast upon Nesa plates, aluminum plates and mylar with a doctor blade and the solvent evaporated. The films are irradiated for 60 seconds by the unfiltered arc of a PEK 110 lamp. The films are then heated with an infrared lamp with no apparent change being observed, i.e., no change in optical density takes place in the film.

EXAMPLE II

A solution is prepared as in Example I except that 1 milliliter of 1.1 M benzophenone in benzene is added as photoactive agent. A film of the sensitized composition is cast on a Mylar sheet and exposed through a stencil T target with the lamp being 10 inches and the stencil being 2 inches from the film for 600 seconds. The Mylar backed film is then heated with the infrared lamp for about 2 minutes at a distance of 2 inches whereupon a visible image corresponding to that of the stencil is observed.

EXAMPLE III

A solution comprising 1 weight percent poly(acetaldehyde), 10 weight percent poly(vinylchloride) and 1 weight percent benzophenone in THF is spread on a glass substrate with a doctor blade having an 8 mil gate to provide a film having a thickness of from 10 to 25 $\mu$. Duplicate experiments are carried out using poly(acetaldehyde) with molecular weights of approximately 85,000 and 103,000 respectively. The films appear translucent upon drying due to the incompatibility of the polymers.

The films are imaged by exposing them to the unfiltered light from a PEK 112 lamp operated at 100 watts for 60 seconds. After exposure, it is observed that the film is clear in the exposed areas thereby providing a positive working imaging system.

EXAMPLE IV

The procedure of Example III is repeated with the exception that the poly(acetaldehyde) has a molecular weight of approximately 250,000. After exposure, it is observed that the exposed areas are more translucent than the non-exposed areas thereby providing a negative working system.

EXAMPLE V

Films are prepared as in Example I except that the doctor blade is adjusted to provide films having thicknesses of approximately 1 $\mu$, 5 $\mu$, 10 $\mu$ and 1 mil respectively. The films are imaged as previously described. Improvement in image quality is observed up to the 5 $\mu$ thickness with no difference being observed between the 10 $\mu$ and 1 mil films thus indicating that a film thickness of about 5 $\mu$ may be optimal in this system.

EXAMPLE VI

Films are prepared as in Example I except that the concentration of photoactive agent is set at 2 percent, 5 percent and 10 percent respectively. Good images are obtained at levels of 2 percent and 5 percent. Image quality is reduced in the film containing 10 percent photoactive agent due to crystallization of the material out of the film.

EXAMPLE VII

Solutions of poly(acetaldehyde), poly(vinylchloride) and benzophenone are prepared as in Example I and applied to the substrate in films which are approximately 5 μ thick. The films are imaged as before with the exposure times being 2, 5, 30, 60 and 120 seconds. The film irradiated for 60 seconds exhibits a good image immediately after exposure. The use of a 120 second exposure time provides no improvement over the 60 second period. The 30 second exposure provides a good image but not as rapidly as that obtained with the 60 second exposure. Images are obtained with the 5 second exposure which are not as good as obtained with the longer periods of irradiation. Images are obtained using the 2 second exposure time only with subsequent heating of the film.

Obvious modifications of the present invention may occur to those skilled in the art. These modifications are intended to be encompassed within the scope of the claims and equivalents thereof.

What is claimed is:

1. An imaging process which comprises exposing to activating radiation in an imagewise manner a translucent film comprising a halogenated polymer capable of releasing hydrogen halide, said polymer having dispersed therein:

a. a degradable polymeric composition containing segments characterized by the formula:

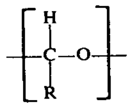

wherein R is H, an alkyl radical of 1 to 6 carbon atoms, a chlorine or fluorine substituted radical of 1 to 6 carbon atoms or a cyano substituted radical of 1 to 5 carbon atoms; and b. a photoactive reagent which upon activation is capable of abstracting a hydrogen atom from the backbone of said degradable polymeric composition and halogenated polymer, wherein said translucent film changes in optical density in the exposed areas to produce an image.

2. The process of claim 1 wherein the degradable polymeric composition is poly(acetaldehyde).

3. The process of claim 1 wherein the degradable polymeric composition is a homopolymer represented by the formula:

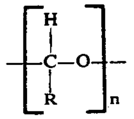

wherein R is as defined above and n is a number within the range of from 20 to 20,000.

4. The process of claim 1 wherein the halogenated polymer corresponds to the formula:

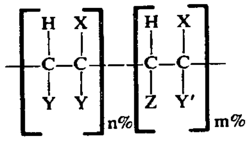

wherein X is chlorine or bromine, Y and Y' are X or hydrogen, Z is Y or an alkyl, aryl or alkaryl constituent containing from 1 to 8 carbon atoms and n and m are numbers from 0 to 100.

5. The process of claim 4 wherein Y is hydrogen, X is chlorine and n is 100.

6. The process of claim 4 wherein Y' is X, Z is H and m is 100.

7. The process of claim 1 wherein the photoactive agent is a composition which when subjected to activating radiation assumes a $^3(n,\pi^*)$ or a $^1(n,\pi^*)$ state.

8. The process of claim 1 wherein the photoactive reagent is an organic peroxide which upon activation forms a free radical.

9. The process of claim 1 wherein the photoactive reagent is an alkyl halide.

10. The process of claim 1 wherein the film contains from 1 to 49 weight percent of the degradable polymeric composition, from 0.1 to 5 weight percent of the photoactive reagent and the balance is made up of the halogenated polymer.

* * * * *